May 11, 1926.
C. A. LARE
1,583,979
COMBINED PHOTOGRAPHIC PRINTER AND ENLARGER
Filed Jan. 31, 1924
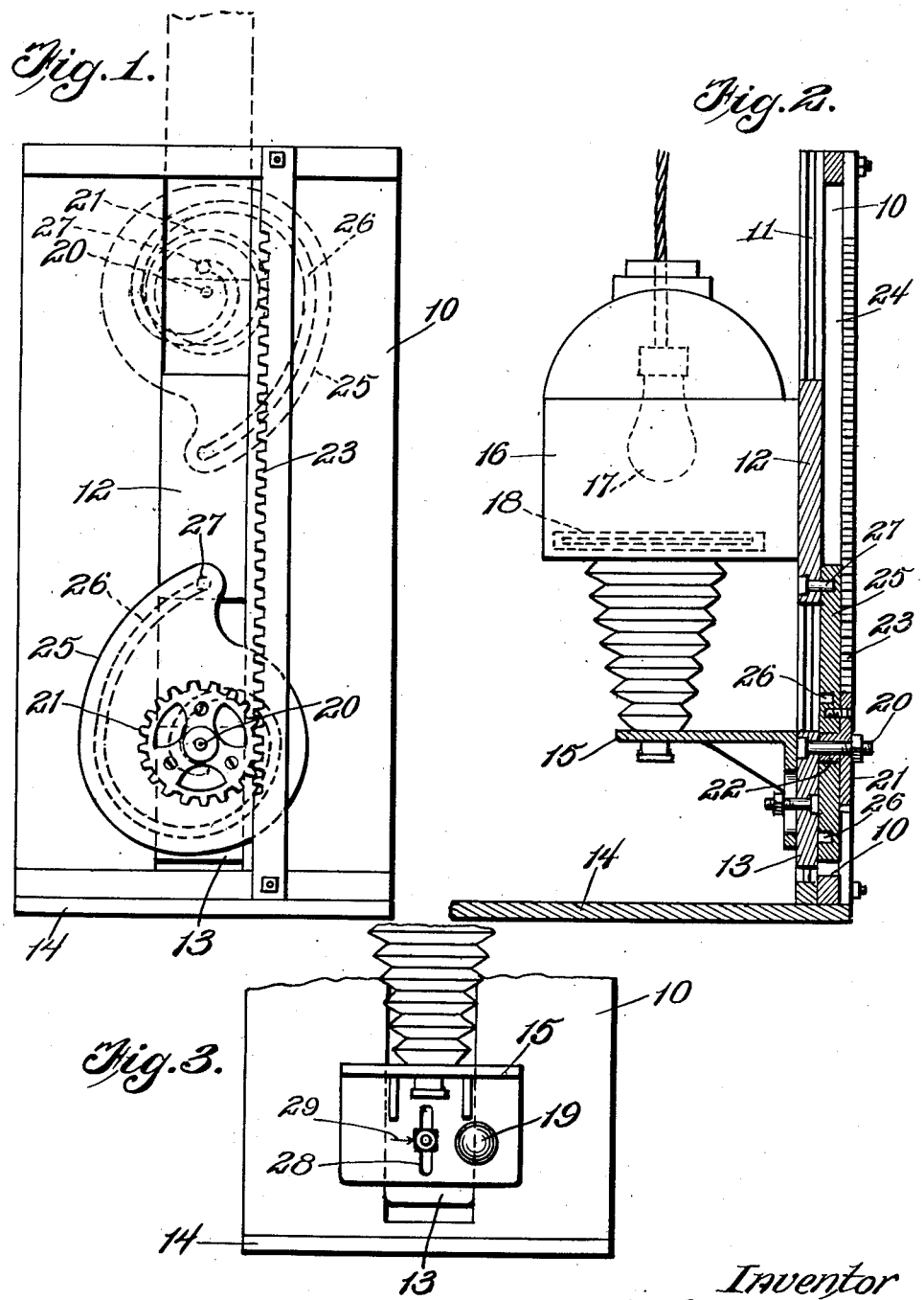

Patented May 11, 1926.

1,583,979

UNITED STATES PATENT OFFICE.

CHARLES A. LARE, OF BALTIMORE, MARYLAND.

COMBINED PHOTOGRAPHIC PRINTER AND ENLARGER.

Application filed January 31, 1924. Serial No. 689,727.

This invention relates to combined photographic printers and enlargers and more particularly to a camera capable of reproducing or printing to a maximum enlargement focus to a maximum reduction focus.

An important object of this invention is to simplify and improve the structure set forth in my co-pending application, Serial No. 622,945, filed March 5, 1923, for photographic printers and enlargers.

A still further and more specific object of the invention is to provide a camera having a shiftable lens support and means operated by the shiftable lens support for shifting the negative support in accordance with the shifting of the lens support, so that a sharp focus is maintained throughout the range from a maximum enlargement of which the camera is capable to the maximum reduction of which the camera is capable.

A still further object of the invention is to provide apparatus of this character including a member rotated by the shifting of the lens support and which by its rotation differentially shifts the negative support to maintain the proper focus.

A still further object of the invention is to provide a device of this character which is extremely simple in its construction and operation, which will be durable and efficient in service and a general improvement in the art.

These and other objects I attain by the construction shown in the accompanying drawings, wherein for the purpose of illustration is shown a preferred embodiment of my invention and wherein:—

Figure 1 is a rear elevation of a camera constructed in accordance with my invention;

Figure 2 is a vertical sectional view therethrough;

Figure 3 is a fragmentary front elevation showing the mounting of the lens board upon its slide.

Referring now more particularly to the drawings, the numeral 10 indicates a support which may be either vertical or horizontal but in the present illustration is shown in the former position. This support is constructed of two side members spaced from one another to afford mountings for tracks 11 upon which are mounted upper and lower sides 12 and 13. At one end of the support 10 an easel 14 is mounted and the slide 13 which is next adjacent the easel has mounted thereon the lens board 15 of the camera. To the other of the slides is secured the light box 16 having therein the usual illuminating element 17 and negative support 18. The general structure of the light box and lens board may be of any desired character, this invention in no way relating to these elements except as in the general combination with the mechanism hereinafter to be described.

In accordance with my invention I provide upon the slide 13 a handle 19 or other suitable means whereby this slide may be reciprocated in the tracks 11. In this slide is mounted a shaft 20 having rotatably mounted thereon a pinion 21 which is spaced from the rear face of the slide by its hub 22. This pinion meshes with a rack 23 which extends longitudinally of the support 10 and which has intermediate its ends and the support spaces 24 maintaining the adjacent faces of the support and rack in spaced relation. Secured to the front face of the pinion 21 is a plate 25 having a cam slot or groove 26 therein, this slot being substantially spiral and extending through approximately 540°. Engaged in this slot is a roller 27 carried by the slide 12 so that the position of the roller in the groove determines the relative positions of the slides 12 and 13. It will, therefore, be seen that by vertically shifting the slide 13 through its handle 19 or other suitable means the slide 12 will likewise be vertically shifted but that this shifting will vary as compared with the shifting of the slide 13.

Referring to Figure 1 wherein I have illustrated in solid lines the position of the slides and cam for the maximum enlargement of which the camera is capable and in dotted lines the position for the minimum reduction of which the camera is capable, it will be seen that movement from one to the other of these positions can be continuously performed, that no adjustment of the camera other than the shifting of the slide 13 will be necessary and that the parts necessary to perform the adjustments are reduced to a minimum. It will, of course, be understood that the construction of the cam herein illustrated is only intended to in a general way indicate the proper shaping of such a cam and it will furthermore be understood that proportions of the various parts employed in illustration will be to a great extent modified in the actual construction of the camera. I do not wish to be understood as limiting myself to the use of a handle for shifting the slide 13 as any suitable means may be provided to accomplish this shifting. The lens board 15 or light box 16 may be made adjustable upon their slides if so desired, this construction being possibly preferred due to the fact that it will enable use of the camera for making of slightly out of focus prints as is desired at times. Such an adjustment is illustrated generally at 28 and indicia 29 indicating the proper position of the box or lens board when at a correct focal point. Since, as indicated above, the device is capable of a considerable range of change and modification without in any manner departing from the spirit of my invention, I do not limit myself to such specific structure as hereinbefore set forth except as hereinafter claimed.

I claim:—

1. Photographic printing apparatus comprising a support constructed to provide tracks, an easel secured to the support, a pair of slides mounted in said tracks and adjustable toward and away from the easel, a lens board carried by one of the slides, a light box carried by the other of the slides, a rack secured to the support, a pinion carried by the first named slide and engaging the rack, and a cam secured to the pinion and directly engaged with the second slide.

2. In photographic printing apparatus, a support constructed to provide tracks, an easel secured to the support, a pair of slides mounted in said tracks and adjustable toward and away from the easel, a lens board carried by one of the slides, a light box carried by the other of the slides, a rack secured to the support, a pinion carried by the first named slide and engaging the rack, a member having a cam groove secured to the pinion and a roller carried by the second slide and engaging in said groove.

3. Photographic printing apparatus comprising a support constructed to provide tracks, an easel secured to the support, a pair of slides mounted in said tracks and adjustable toward and away from the easel, a lens board carried by one of the slides, a light box carried by the other of the slides, a rack secured to the support, a pinion carried by the first named slide and engaging the rack, a cam secured to the pinion and directly engaging the second slide, said rack being in spaced relation to the support, said cam operating between the rack and support.

In testimony whereof I hereunto affix my signature.

CHARLES A. LARE.